United States Patent
Pawar et al.

(10) Patent No.: US 10,070,340 B1
(45) Date of Patent: Sep. 4, 2018

(54) ADAPTIVE BIT RATE STREAMING BASED ON EXTENTS TO WHICH UES PROVIDE WIRELESS BACKHAUL

(71) Applicant: Sprint Spectrum L.P., Overland Park, KS (US)

(72) Inventors: Hemanth B. Pawar, Brambleton, VA (US); Shilpa K. Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 72 days.

(21) Appl. No.: 15/271,736

(22) Filed: Sep. 21, 2016

(51) Int. Cl.
*H04W 28/02* (2009.01)
*H04L 12/26* (2006.01)
*H04W 88/04* (2009.01)
*H04W 88/08* (2009.01)

(52) U.S. Cl.
CPC ......... *H04W 28/0257* (2013.01); *H04L 43/16* (2013.01); *H04W 88/04* (2013.01); *H04W 88/08* (2013.01)

(58) Field of Classification Search
CPC . H04W 28/0257; H04W 88/04; H04W 88/08; H04L 43/16
See application file for complete search history.

(56) References Cited

U.S. PATENT DOCUMENTS

| 8,423,033 B1 | 4/2013 | Everson et al. | |
|---|---|---|---|
| 2009/0150557 A1* | 6/2009 | Wormley | H04N 21/23424 709/231 |
| 2009/0328124 A1* | 12/2009 | Khouzam | H04N 21/234354 725/116 |
| 2014/0057593 A1* | 2/2014 | Cloutier | H04W 12/08 455/405 |
| 2014/0344443 A1* | 11/2014 | MacInnis | H04L 43/08 709/224 |
| 2014/0344468 A1* | 11/2014 | Saremi | H04L 65/105 709/231 |
| 2014/0351385 A1* | 11/2014 | Li | H04L 65/601 709/219 |
| 2016/0080237 A1* | 3/2016 | Halepovic | H04L 43/0894 709/224 |
| 2016/0366202 A1* | 12/2016 | Phillips | H04L 43/08 |

OTHER PUBLICATIONS

Adaptive bitrate streaming, Wikipedia, available at https://en.wikipedia.org/wiki/Adaptive_bitrate_streaming, last accessed Aug. 5, 2016.

* cited by examiner

*Primary Examiner* — Kashif Siddiqui

(57) ABSTRACT

Example methods and an example controller for controlling a bit rate at which a media server streams media content to a UE are provided. The example controller includes at least one processing unit and data storage having instructions executable by the processing unit to carry out operations. The operations include determining an extent to which the UE provides wireless backhaul connectivity between its serving base station and at least one device other than the UE. Further, the operations include, based on the determined extent, (i) establishing the bit rate and (ii) causing the media server to stream a portion of media content to the UE at the established bit rate.

19 Claims, 4 Drawing Sheets

ADAPTIVE BIT RATE STREAMING BASED ON EXTENTS TO WHICH UES PROVIDE WIRELESS BACKHAUL

BACKGROUND

A wireless communication system may include a number of base stations (e.g., cellular base stations, WiFi access points, or the like) that radiate to define wireless coverage areas, such as cells and cell sectors, in which user equipment devices (UEs) such as cell phones, tablet computers, tracking devices, embedded wireless modules, and other wirelessly equipped communication devices (whether or not controlled by a human user), can operate. In turn, each base station may be coupled with network infrastructure, including one or more gateways, routers, and switches, that provides connectivity with one or more transport networks, such as the public switched telephone network (PSTN) and/or a packet-switched network such as the Internet for instance. With this arrangement, a UE within coverage of a base station may engage in air interface communication with the base station and may thereby communicate via the base station with various remote network entities or with other UEs.

In a typical system, each base station's coverage area may operate on one or more carrier frequencies and may define various channels for carrying control and bearer communications between the base station and the UEs in the base station's coverage area. Further, the base station may work with UEs in its coverage to manage assignment and/or use of various air interface resources, such as particular channels or portions of channels, for carrying communications to and from the UEs. For instance, as the base station receives packet data from the network infrastructure for transmission to UEs on various bearers, the base station may queue the data, schedule use of particular downlink air interface resources (e.g., channels, resource blocks, or the like) to carry the data, and transmit the data on the scheduled resources to the destination UEs. Likewise, as UEs have data to transmit on various bearers, the base station may schedule use of particular uplink air interface resources to carry the data, and the UEs may transmit the data on the scheduled uplink resources to the base station.

Optimally, a wireless service provider will strategically implement base stations throughout a market area so that served UEs can move between the base station coverage areas without loss of coverage. Each base station may include an antenna structure and associated equipment, and the wireless service provider may connect the base station by a landline cable (e.g., a T1 line) with the service provider's network infrastructure to enable the base station to communicate with a signaling controller (e.g., MME), gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To connect a base station with the network infrastructure in such a situation, the wireless service provider may implement a wireless backhaul connection between the base station and another base station of the service provider's network. In this situation, the base station at issue operates as a relay base station, and the other base station operates as a donor base station. In practice, the relay base station includes or is coupled (e.g., via a local area network or other connection) with a UE, referred to as a relay-UE, and the donor base station then serves the relay-UE in much the same way that the donor base station serves other UEs. Further, the relay base station itself serves UEs, in much the same way that any base station would. For example, when a UE enters into coverage of the relay base station, the UE may signal to the relay base station to initiate an attach process, the UE may acquire an IP address, and an MME may engage in signaling to establish one or more bearers between the UE and a gateway system. Each of these bearers though, would pass via the wireless backhaul connection.

Further, in such wireless communication systems, a media server communicate streaming media content to UEs, and therefore, base stations sometimes transmit streaming media content to their served UEs. Such streaming media content may include audio and/or video. While a UE is receiving streaming media content, variations in network conditions can adversely affect the user experience. For example, if the available bandwidth suddenly decreases, a user of the UE may notice a degradation in quality, such as a media stream that stalls or buffers.

Adaptive bit rate streaming is one technique to reduce such problems. Adaptive bit rate streaming works by adjusting in real time the bit rate of the streaming media content based on knowledge of a UE's wireless conditions. The bit rate refers to the number of bits that are conveyed or streamed per unit of time (e.g., number of bits per second).

In one implementation, an encoder encodes a particular instance of media content at multiple bit rates, yielding multiple versions of the instance of media content each having a different bit rate. For instance the encoder may establish different versions having different bit rates by changing the frame rate and/or resolution at which each version is encoded.

Further, to stream the instance of media content to the UE, the media server then selects an appropriate version of the instance of media content, and communications the selected version to the UE. As the media server streams the instance of media content to the UE, the media server may switch between streaming different versions to the UE depending on the UE's wireless conditions. For example, initially, the media server may stream a version of the instance of media content with a first bit rate. As the UE receives streaming media content from the media server, the UE or the UE's serving base station may send a message to the media server regarding the UE's RF conditions. And if, for instance, the UE's RF conditions decrease, the media server may switch to streaming a version of the instance of media content that is encoded at a lower bit rate than the first bit rate. Adjusting the bit rate over time may reduce buffering time and allow faster starting times. Further, the ability to adjust the bit rate for different UEs may enable the media server to provide good user experiences for both UEs with good wireless conditions and UEs with poorer wireless conditions.

OVERVIEW

Ideally, to help ensure a positive user experience, a media server could be configured to stream media content to a UE at a bit rate that is adjusted in real time to be a highest bit rate that the UE's respective bandwidth availability and RF conditions currently support. This would allow the UE to always receive the highest quality (e.g., highest resolution and/or frame rate) streaming media content that their respective bandwidth availability and RF conditions currently support. Unfortunately, however, this streaming arrangement could present issues for any UEs providing wireless backhaul connectivity between their serving base station and at least one other device.

For instance, if a UE being served by a base station is receiving streaming media content at a highest bit rate and the UE is also serving one or more devices, the transmission of streaming media content to the UE could adversely impact the communication of each other device with the base station via the UE. Specifically, the UE's connection with its serving base station may have a limited bandwidth, and data being transmitted to the UE in conjunction with the streaming could consume a significant portion of the limited bandwidth, thereby limiting the bandwidth available to carry traffic to and from the one or more devices. Such consumption of the bandwidth on the UE's connection due to receiving streaming media content could lead to delays in transmissions of bearer data to and from the one or more devices being served by the UE, resulting in a poor user experience.

In addition, in a relay arrangement where the UE is coupled to a relay base station that serves other UEs, data being transmitted to the UE in conjunction with the streaming could limit the bandwidth available to carry bearer data and control signaling to and from the relay base station for purposes of serving the other UEs. For instance, data being transmitted to the UE in conjunction with the streaming could limit the bandwidth available to carry control signaling to set up a Voice over Long-Term Evolution (LTE) network (VoLTE) call or other communication session or limit the bandwidth available to carry bearer data to and from end-user UEs. Consequently, an improvement is desired.

The present disclosure provides for using the extent to which a UE provides at least one other device with wireless backhaul connectivity as a basis for establishing the bit rate at which a media server streams media content to the UE. As such, the disclosure draws a distinction between a UE operating as an endpoint (e.g., end-user) device that is not configured to provide at least one other device with wireless backhaul connectivity to the UE's serving base station, and a UE operating as a relay-UE, hotspot-UE, or the like, that is configured to provide at least one other device with wireless backhaul connectivity to the UE's serving base station. The theory here is that if a UE provides wireless backhaul connectivity for one or more other devices, the UE's receiving of streaming media content may impact the communication of each other device with the UE's serving base station via the UE, and so it would be beneficial to limit the bit rate at which a media server streams media content to the UE, to limit the bandwidth that the streaming media content consumes. Whereas, if a UE does not provide wireless backhaul connectivity for one or more other devices, the UE's receiving of streaming media content would not have that impact, and so the UE could perhaps be permitted to receive streaming media content at a higher bit rate.

In accordance with the disclosure, a UE, the UE's serving base station, and/or another network entity could thus determine an extent to which a UE provides wireless backhaul connectivity between the UE's serving base station and at least one device other than the UE, and could then establish the bit rate based on the determined extent. Establishing the bit rate may involve determining or deciding what the bit rate should be. For instance, establishing the bit rate may involve selecting a bit rate from one of a plurality of predetermined bit rates.

Determining the extent at issue could involve determining whether or not the UE is the type of device that provides wireless backhaul connectivity, such as whether or not the UE is configured, used, connected, or arranged to provide such connectivity. For instance, determining the extent could involve determining whether the UE is just an endpoint device, or rather is configured or connected to function as a relay, hotspot, or the like.

Alternatively or additionally, determining the extent at issue could involve determining whether the UE is currently providing wireless backhaul connectivity for at least one other device. Further, the extent at issue could specifically be a quantity of other devices the UE is currently providing with such connectivity. For instance, if the UE is currently providing wireless backhaul connectivity between at least three other devices and the base station, then it may be appropriate to establish a lower bit rate. Whereas, if the UE is providing connectivity for fewer such devices (or no such devices), then it may be appropriate to establish a higher bit rate.

In some examples, the UE itself could determine the extent to which the UE provides wireless backhaul connectivity between the UE's serving base station and at least one device other than the UE, and then the UE could establish the bit rate based on the determined extent. Alternatively, the UE could determine the extent to which the UE provides wireless backhaul connectivity between the UE's serving base station and at least one other device, and the UE could then send the determined extent to another network entity (e.g., the serving base station or a media server) to enable that other entity to establish the bit rate based on the determined extent.

In one example implementation, the UE or the serving base station could establish the bit rate, and after the UE or the serving base station establishes the bit rate, the UE or the serving base station could cause the media server to stream media content to the UE at the established bit rate. For instance, the UE or the serving base station could send a message to the media server specifying the established bit rate for the UE. The media server, in turn, could then stream media content to the UE at the established bit rate.

In another example implementation, the UE itself could establish the bit rate, and then carry out operations that cause the media server to stream media content to the UE at the established bit rate. For instance, the UE could send to a media server a request for streaming media content. In response to receiving the request, the media server could then send to the UE an index file identifying multiple versions of a media file that are each encoded at different bit rates and, for each of the multiple versions, identifying a respective bit rate at which the version is encoded. Further, for each version, the index file could identify different segments of the version that can be streamed to the UE. Based on the established bit rate, the UE could then select, using the index file, a particular version of the media file based on the particular version being encoded at the established bit rate. And the UE could request one or more portions of the particular version of the media file.

Further, the UE, the serving base station, the media server, or another network entity could take into account factors such as available bandwidth and RF conditions when establishing the bit rate at which the UE receives streaming media content.

Accordingly, in one respect, disclosed is a method for controlling a bit rate at which a media server streams media content to a UE. The method is carried out in a communication system in which a base station serves the UE over an air interface. The method involves determining an extent to which the UE provides wireless backhaul connectivity between the base station and at least one device other than the UE. And the method involves, based on the determined extent, (i) establishing the bit rate and (ii) causing the media server to stream a portion of media content to the UE at the established bit rate.

In another respect, disclosed is a controller configured to control a bit rate at which a media server streams media content to a UE, with the UE being served by a base station. The controller includes at least one processing unit. The controller also includes data storage comprising instructions executable by the processing unit to carry out various operations. In particular, the operations include determining an extent to which the UE provides wireless backhaul connectivity between the base station and at least one device other than the UE. The operations also include, based on the determined extent, (i) establishing the bit rate and (ii) causing a media server to stream a portion of media content to the UE at the established bit rate.

In still another respect, disclosed is a method for controlling a bit rate at which a media server streams media content to a UE. The method is carried out in a communication system in which a base station serves the UE over an air interface. According to the method, the UE receives an index file identifying (i) multiple versions of a media file that are each encoded at different bit rates and (ii) for each of the multiple versions, a respective bit rate at which the version is encoded. The method also includes determining an extent to which the UE provides wireless backhaul connectivity between the base station and at least one device other than the UE. Further, the method includes, based on the determined extent: (i) the UE establishing the bit rate, (ii) selecting, by the UE using the index file, a particular version of the media file based on the particular version being encoded at the established bit rate, and (ii) requesting, by the UE, a portion of the particular version of the media file from a media server. And the method includes, responsive to the requesting, receiving, from the media server, a portion of the particular version of the media file.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present methods and systems will be described herein in the context of LTE as an example air interface protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
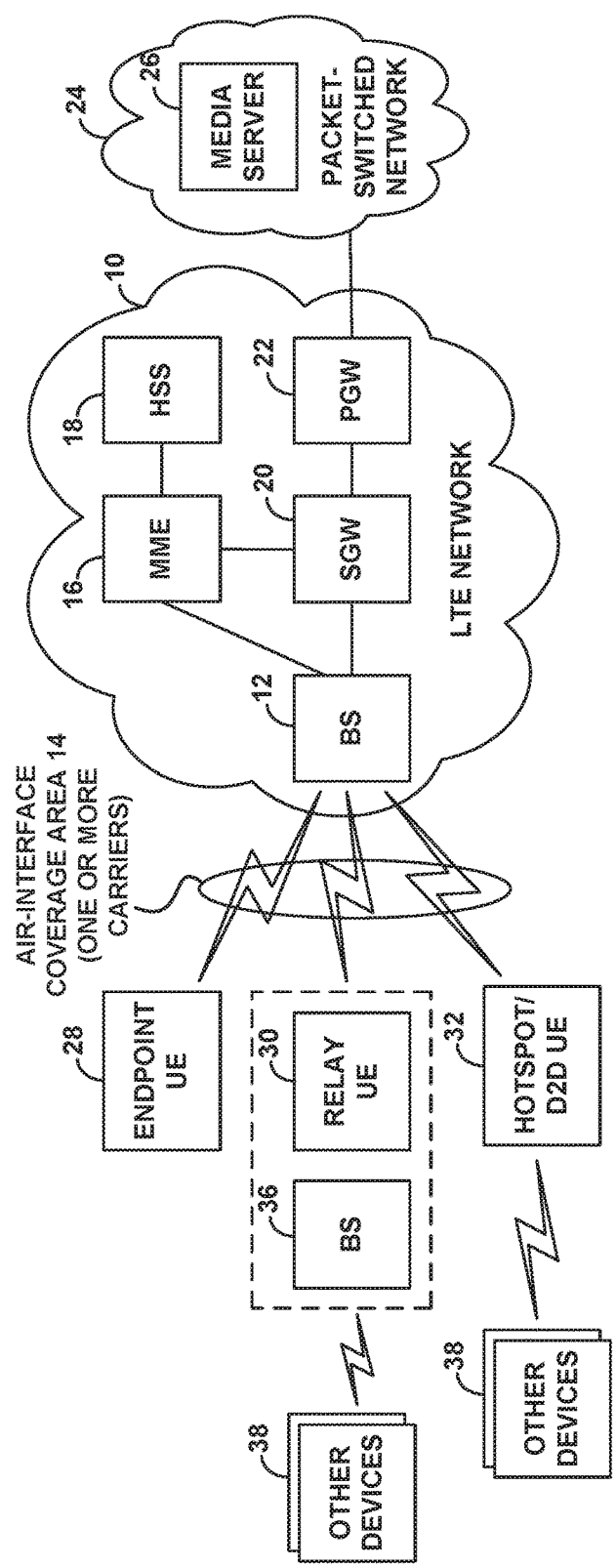
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts a representative LTE network 10, which functions primarily to serve UEs with wireless packet data communication service, including possibly voice-over-packet service, but may also provide other functions. As shown, the LTE network 10 includes a base station (LTE evolved Node-B (eNodeB)) 12, which has an antenna structure and associated equipment for providing an LTE coverage area 14 in which to serve the UEs. The base station 12 then has a communication interface with a mobility management entity (MME) 16 that functions as a signaling controller for the LTE network 10 and has a communication interface with a home subscriber server (HSS) 18. Further, the base station 12 has a communication interface with a serving gateway (SGW) 20, which in turn has a communication interface with a packet-data-network gateway (PGW) 22 that provides connectivity with a packet-switched network 24 such as the Internet, and the MME 18 has a communication interface with the SGW 20. Further, FIG. 1 illustrates an example media server 26 sitting as a node on the packet-switched network 24. In practice, the illustrated components of the LTE network 10 may sit as nodes on a private packet-switched network owned by an operator of the LTE network 10, and thus the various communication interfaces may be logical interfaces within that network.

In addition, FIG. 1 illustrates three example UEs 28, 30, 32 being served by the base station 12 over an air interface 14 (e.g., within a particular coverage area of the base station). UE 28 is a typical end-user UE such as a cell phone or wirelessly-equipped computer, tablet, or other device that does not provide wireless backhaul connectivity for at least one other device. UEs 30 and 32, on the other hand, are UEs that provide wireless backhaul connectivity for at least one other device. In particular, UE 30 is connected, configured, or otherwise arranged as a relay-UE coupled or integrated with a small cell base station (also referred to as a "mini-macro base station") 36 or the like that is in turn configured (similar to base station 12) to serve other devices 38. UE 30 functions as an intermediary between base station 12 and any devices served by small cell base station 36, with the air interface connection between UE 30 and base station 12 functioning as a wireless backhaul link for the small cell base station 36. And UE 32 is configured as a hotspot or device-to-device (D2D) UE (such as a cell phone having a personal-hotspot feature), similar to the relay-UE, to function as an intermediary between base station 12 and one or more other devices 38, similar to the relay-UE. For example, a hotspot UE can be configured to turn on its personal-hotspot feature by way of a software switch so that the UE then begins to operate in a hotspot mode in which it is set to (i) connect via WiFi or another connection with one or more endpoint devices, (ii) engage in communication with a base station (e.g., base station 12) via a cellular air interface, and (iii) bridge those communications.

In practice, when any such UE (end-user, relay, or hotspot) enters into coverage of an LTE base station such as base station 12, the UE may engage in a process to attach with, hand over to, or otherwise associate with the base station, which may result in establishment of a radio-link-layer connection (e.g., radio resource control (RRC) connection) over the air interface between the UE and the base station so that the base station can then provide the UE with LTE service. For instance, in this attach process, the UE may transmit an attach request to the base station, which the base station may forward to the MME, and the MME may then engage in signaling to control setup of one or more bearers for carrying data for the UE between the PGW and the base station. Further, in this attach process, the UE may convey to the base station information about the UE's profile and configuration, and/or the MME may also receive such UE information from the HSS and convey that information to the base station, and the base station may store this information in a local context record for the UE.

Additionally, in practice, each such UE may store profile, configuration, or status data that specifies the extent to which the UE provides wireless backhaul connectivity for at least one other device. For instance, the UE could store data that indicates whether the UE is the type of device that provides such connectivity. By way of example, the UE could store an indication of whether the UE is configured, connected, or otherwise arranged, to operate as a relay-UE for a small cell base station, or is configured to operate as a hotspot UE as discussed above. Or rather, as another example, the UE could store an indication that the UE is just an endpoint (e.g., end-user) device. Further, if the UE is the type of device that provides such connectivity, the UE could store data that indicates how many other devices the UE is currently providing with such connectivity.

This data could be established and stored in each UE in various ways and at various times. For instance, at the time of manufacture, distribution, or deployment, a UE could be provisioned with data that specifies whether the UE is the type of device that will provide wireless backhaul connectivity for at least one other device, such as whether the UE will function as a relay-UE or hotspot UE or will rather function as an endpoint UE. Further, while in use, the UE could be provisioned or re-provisioned with such data if the profile, configuration, or status of the UE changes, such as if an endpoint UE gets connected and set to function as a relay-UE or gets provisioned with hotspot functionality.

By way of example, an endpoint UE could be provisioned with data indicating that the UE does not provide wireless backhaul connectivity for at least one other device (or, just as well, could lack data that indicates that the UE provides such connectivity for at least one other device). Further, a relay-UE or hotspot UE could be provisioned with data indicating that the UE is configured to provide wireless backhaul connectivity for at least one other device, such as a general indication that the UE provides such connectivity, or a specific indication that the UE is currently providing such connectivity. For instance, when a relay-UE is configured to provide such connectivity, the relay-UE may set a context record parameter or flag once the UE has established local area network (LAN) communication or the like with a small cell base station and/or once the UE acquires a bearer specifically for serving a small cell base station. And a hotspot UE may store, as a context record parameter or flag, an indication of whether the hotspot UE includes a personal-hotspot feature for providing hotspot service, or an indication of whether the personal-hotspot feature is currently turned on or off.

Still further, a UE that provides wireless backhaul connectivity for at least one other device could be provisioned with data that indicates the quantity of such devices for which the UE is currently providing connectivity. For instance, a relay-UE could receive from its associated small cell base station an indication of the quantity of other devices that are currently connected with or otherwise served by the small cell base station, including updates as the quantity changes, and could store that quantity as the quantity of devices for which the relay-UE is currently providing wireless backhaul connectivity. And a hotspot UE could likewise determine and store an indication of how many other devices the hotspot UE is currently providing with connectivity. Variations and other examples are possible as well.

In addition, base station 12, MME 16, or another LTE entity may also store such profile, configuration, or status data respectively for each UE that is attached with the base station. The base station could receive some of this data from the UE or from the UE or from the MME, perhaps when the UE initially attaches with the base station, and the base station could store the data in a context record for the UE as a context record parameter, profile parameter, or the like that is keyed to a UE identifier such as an International Mobile Subscriber Identity (IMSI) or a public land mobile network (PLMN) ID. Further, as the UE's configuration or status changes, such as if the UE transitions between being an endpoint UE to being a UE that provides connectivity for at least one other device, or when the quantity of devices for which the UE provides wireless backhaul connectivity changes, the base station could receive updated data indicating the change. For instance, the UE could be programmed with logic that causes the UE to send profile, configuration, or status data to the base station if and when the quantity of devices for which the UE provides wireless backhaul connectivity changes or changes by more than a threshold amount.

In operation, media server 26 may function to store and communicate streaming media content (such as voice, audio, video, or the like) to various devices, such as any of UEs 28, 30, and 32 or any of the other devices 38. More specifically, the media server may store various media content, such as one or more video files and/or audio files.

To facilitate adaptive bit rate streaming of a particular instance of media content, media server (or another entity) may encode various versions of the particular instance of media content, with each version having a different bit rate. By way of example, the media server may receive an original version of a video that is of 1080p resolution and a frame rate of 60 frames per second (fps). Ordinarily, a bandwidth of about 4,500-9,000 kilobytes per second (kbps) may be recommended to stream the original version of the video. To facilitate adaptive bit rate streaming, media server may also encode one or more downgraded versions of the video. For instance, the media server may encode a first downgraded version of the video with a resolution of 480p and a frame rate of 30 fps. A lesser bandwidth of about 500-2,000 kbps may be sufficient to stream the first downgraded version of the video. The media server may also encode a second downgraded version of the video with a resolution of 240p and a frame rate of 30 fps. An even lesser bandwidth of less than 500 kbps may be sufficient to stream the second downgraded version.

Furthermore, the media server may segment each of the different encoded versions of an instance of media content into multi-second segments. For example, continuing with the example of the video above, the media server may segment the original version of the video into two-second media segments, segment the first downgraded version of the video into two-second media segments, and segment the second downgraded version of the video into two-second media segments. The size of the media segments may vary depending on the desired implementation. For instance, rather than segmenting the encoded versions into two-second media segments, the media server may segment the encoded versions into four-second media segments or ten-second media segments. The individual media segments or a version may be stored as individual files or the individual media segments may be stored as a single file.

The media server may also create an index file for each instance of media content. As an example, an index file for a particular instance of media content may identify multiple versions of the index file that are each encoded at different bit rates and, for each of the multiple versions, a respective bit rate at which the version is encoded. Further, the index file may identify the multi-second segments of each of the multiple versions.

In operation, the media server may stream to a device, such as any of UEs 28, 30, and 32 or any of the other devices 38, individual segments from appropriate version(s) of the video. The media server may select the individual segments based on a desired bit rate. For instance, initially, the media server may, by default, be arranged to stream segments from a lowest bit rate version, such as the second downgraded version of the original video. If it is determined (e.g., by the media server) that the device can later support a higher bit rate, the media server may switch to streaming to the device individual segments from a higher bit rate version, such as the first downgraded version of the original video. Further, if at later time it is determined that the device can no longer support the higher bit rate (e.g., due to deteriorating RF conditions), the media server may transition to streaming to the device segments from a lower bit rate version.

More specifically, in a server-driven adaptive bit rate streaming implementation, a device may request streaming content from the media server using one or more commands, processes, and procedures that are governed by a streaming protocol, such as Real-time Transport Protocol/Real-Time Streaming Protocol (RTP/RTSP), HTTP Live Streaming (HLS), HTTP Dynamic Streaming, and Smooth Streaming. The media server may then deliver particular segments of one or more versions of the media content to the device, selecting the particular segments from one version or another according to the desired bit rate. For instance, if the media server determines that the device has sufficient bandwidth to support a highest bit rate, the media server may deliver segments from an original version of the media content to the device. However, if the media server later determines that the bandwidth has decreased, the media server may switch to delivering segments from a downgraded version of the media content to the device.

Alternatively, in another implementation, the device itself may carry out operations that cause the device to receive streaming media content at a particular bit rate. For instance, in a client-drive adaptive bit rate streaming implementation, a device may similarly request content from the media server using one or more commands, processes, and procedures that are governed by a streaming protocol. Upon receiving a request for media content, the media server may then inform the device of the available versions of the media content and the individual segments of the available versions. For instance, the media server may send to the device an index file identifying the addresses (e.g., uniform resource locators (URLs)) of each available version and also identifying the respective rate at which each version is encoded. The device can then determine an appropriate bit rate (e.g., based on the device's wireless conditions), and use the index file to select and request the appropriate media segments.

As noted above, the present disclosure provides for using the extent to which a UE provides at least one other device with wireless backhaul connectivity as a basis for establishing the bit rate at which a media server streams media content to the UE. For instance, if a UE provides wireless backhaul connectivity for one or more other devices, then the UE, the UE's serving base station, or another network entity may establish a first bit rate and cause the media server to stream media content to the UE at the first bit rate. Whereas, if a UE does not provide wireless backhaul connectivity for one or more other devices, then the UE, the UE's serving base station, or the other network entity could establish a second bit rate that is higher than the first bit rate and cause the media server to stream media content to the UE at the second bit rate.

To do this in practice, the UE, the UE's serving base station, the media server (or another network entity) could be programmed with logic executable to determine the extent to which the UE provides wireless backhaul connectivity for at least one other device. For instance, the UE or the UE's serving base station could determine the extent by referring to the data discussed above that indicates the extent to which the UE provides wireless backhaul connectivity. The media server could also determine the extent based on data received from the UE or the UE's serving base station. For instance, the data could indicate the extent to which the UE provides wireless backhaul connectivity between the UE's serving base station and at least one other device, and the UE or the UE's serving base station could be configured to send such data to the media server when the UE initially requests to receive streaming media content. Further, as the UE receives streaming media content, the UE or the UE's serving base station could be configured to update the media server if the extent to which the UE provides at least one other device with wireless backhaul connectivity changes.

In addition, the UE, the UE's serving base station, or the media server could be programmed with mapping data that correlates various bit rates with various extents to which a UE provides wireless backhaul connectivity between at least one other device and the base station. Thus, the UE, the UE's serving base station, or the media server could determine the extent to which the UE provides wireless backhaul connectivity for at least one other device and could then refer to the mapping data so as to establish a bit rate for the UE.

If the UE establishes the bit rate, the UE could then transmit to the media server a control message interpretable by the media server to cause the media server to stream media content to the UE at the established bit rate. Alternatively, in a client-drive adaptive bit rate streaming implementation, after establishing the bit rate, the UE could carry out various operations to cause the media server to stream media content to the UE at the established bit rate. For instance, the UE could select, using an index file, media segments having the established bit rate, and then request the selected media segments from the media server.

If the UE's serving base station establishes the bit rate, the base station could similarly then transmit to the media server a control message interpretable by the media server to cause the media server to stream media content to the UE at the established bit rate. Alternatively, in a client-driven adaptive bit rate streaming implementation, after establishing the bit rate, the base station could transmit to the UE a control message. The control message could be interpretable by the UE to cause the UE to cause the media server to stream media content to the UE at the established bit rate. For instance, the control message to the UE could identify the established bit rate, and the UE could then select and request media segments having the established bit rate.

If the media server establishes the bit rate, the media server could then proceed to streaming media content to the UE at the established bit rate. For instance, the media server can select media segments having the established bit rate, and communicate the selected media segments to the UE.

Figure 2:
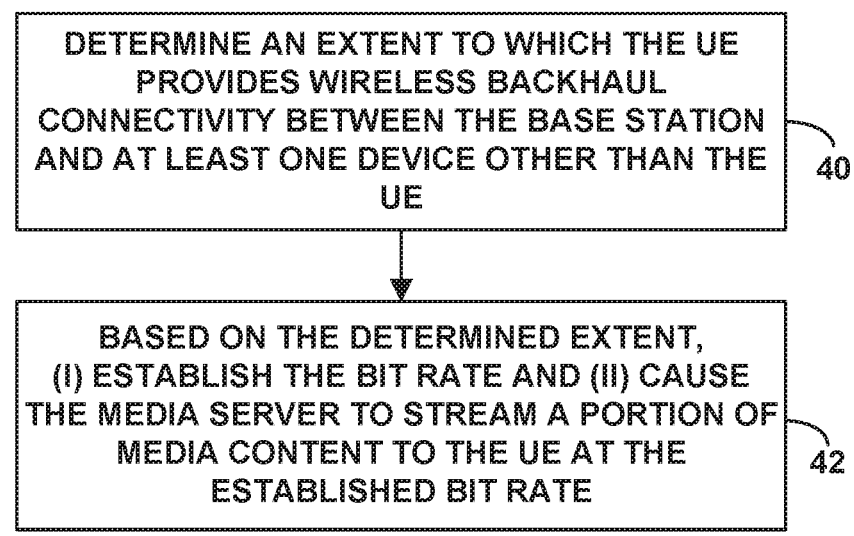
FIG. 2 is a flow chart depicting example operations in accordance with the disclosure.

FIG. 2 is next a flow chart depicting features of a representative method for controlling the bit rate at which a media server streams media content to the UE, where a base station serves the UE over an air interface. As shown in FIG. 2, at block 40, the method includes determining an extent to which the UE provides wireless backhaul connectivity between the base station and at least one device other than the UE. And at block 42, the method then includes, based on the determined extent, (i) establishing the bit rate and (ii) causing the media server to stream a portion of media content to the UE at the established bit rate.

In line with the discussion above, the portion of media content may be a particular one of multiple versions of a media file, where each version of the multiple versions is encoded at a different bit rate. Accordingly, causing the media server to stream the portion of media content to the UE at the established bit rate may involve causing the media server to stream to the UE the portion of the particular version of the media file based on the particular version being encoded at the established bit rate. As a particular example, the portion of media content may be a portion of a particular one of multiple versions of a video, where each version of the multiple versions is encoded at a different combination of resolution and frame rate. And causing the media server to stream the portion of media content to the UE at the established bit rate may involve causing the media server to stream to the UE the portion of the particular version of the video based on the particular version being encoded with a particular combination of resolution and frame rate, where the particular combination corresponds to the established bit rate.

Further in line with the discussion above, the act of determining the extent to which the UE provides wireless backhaul connectivity between the base station and at least one device other than the UE could involve determining whether the UE provides wireless backhaul connectivity between the base station and at least one device other than the UE (e.g., whether the UE is a relay-UE or a relay-UE type device (perhaps a hotspot/D2D device)). And the act of establishing the bit rate could involve establishing as the bit rate (i) a first bit rate responsive to the determination being that the UE provides wireless backhaul connectivity between the base station and at least one device other than the UE and (ii) a second bit rate responsive to the determination being that the UE does not provide wireless backhaul connectivity between the base station and at least one device other than the UE, with the first bit rate being lower than the second bit rate.

Alternatively or additionally, for a UE that provides wireless backhaul connectivity between the base station and a quantity of other devices, the act of establishing the bit rate could include establishing the bit rate based on the quantity.

As an example, a video may be encoded at a first bit rate corresponding to 480p resolution and a frame rate of 30 fps and also encoded at a second bit rate that is lower than the first bit rate and corresponds to 240p resolution and a frame rate of 30 fps. For a UE that provides wireless backhaul connectivity between the base station and a quantity of other devices, the act of establishing the bit rate could include establishing as the bit rate (i) the second bit rate based on the quantity being more than a predetermined number and (ii) the first bit rate based on the quantity being less than or equal to the predetermined number. For instance, if the predetermined number is four, a first bit rate could be established based on the quantity being one, but a second bit rate that is lower than the first bit rate could be established based on the quantity being five.

Further, causing the media server to stream the portion of media content to the UE at the established bit rate could involve causing the media server to switch from streaming a first portion of media content to the UE at a current bit rate to streaming a second portion of media content to the UE at the established bit rate. For instance, for a UE that is a type of device configured to provide wireless backhaul connectivity between the base station and at least one device other than the UE, the media server could adjust the bit rate over time as the quantity of devices that the UE provides with such connectivity changes.

More specifically, at a first time period, the UE could be providing such connectivity for a first quantity of devices that is less than a threshold. Accordingly, the UE or the UE's serving base station could establish a first bit rate based on the first quantity, and could cause the media server to stream a portion of media content to the UE at the first bit rate. Subsequently, the UE could begin providing such connectivity for a second quantity of devices that is different from the first quantity, and the UE or the UE's serving base station could determine that a difference between the first quantity and the second quantity exceeds a threshold amount. For instance, the UE or the UE's serving base station could periodically check their latest data on the extent to which the UE provides wireless backhaul connectivity for at least one other device to determine the second quantity, and check whether the difference between the second quantity and the first quantity is greater than the threshold amount. Responsive to determining that the difference exceeds the threshold amount, the UE or the UE's serving base station could establish, based on the second quantity, another bit rate other than the established bit rate. And the UE or the UE's serving base station could then cause the media server to stream a portion of media content to the UE at the other bit rate.

Figure 3:
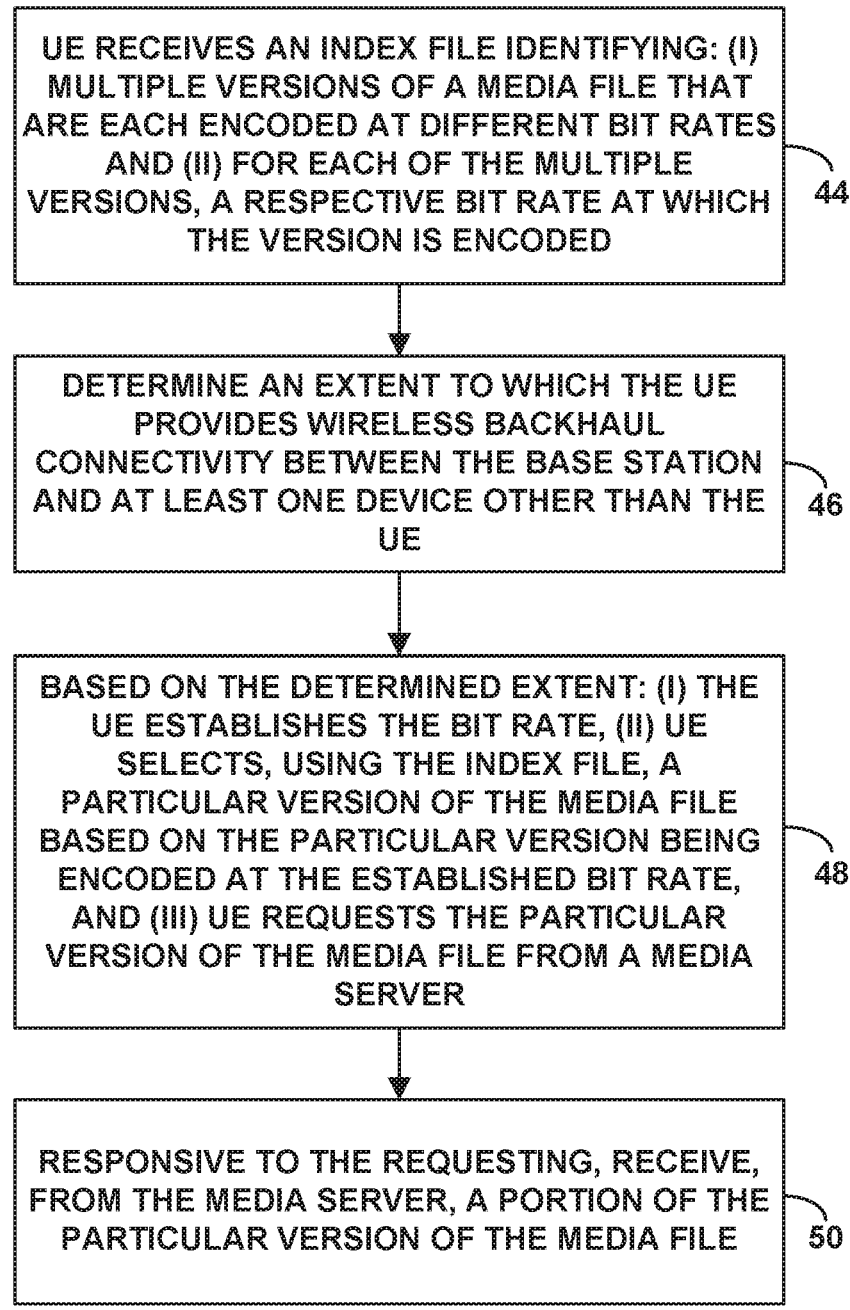
FIG. 3 is another flow chart depicting example operations in accordance with the disclosure.

FIG. 3 is next a flow chart depicting features of a representative method for controlling the bit rate at which a media server streams media content to a UE, where a base station serves the UE over an air interface. As shown in FIG. 3, at block 44, the method includes the UE receiving an index file identifying: (i) multiple versions of a media file that are each encoded at different bit rates and (ii) for each of the multiple versions, a respective bit rate at which the version is encoded. At block 46, the method then includes determining an extent to which the UE provides wireless backhaul connectivity between the base station and at least one device other than the UE. Further, at block 48, the method includes, based on the determined extent: (i) the UE establishing the bit rate, (ii) the UE selecting, using the index file, a particular version of the media file based on the particular version being encoded at the established bit rate, and (iii) the UE requesting the particular version of the media file from a media server. And at block 50, the method includes, responsive to the requesting, receiving, from the media server, a portion of the particular version of the media file.

In line with the discussion above, each version of the multiple versions may be encoded at a different combination of resolution and frame rate. Further, selecting the particular version of the media file based on the particular version being encoded at the established bit rate may involve selecting the particular version of the media file based on the particular version being encoded with a particular combination of resolution and frame rate, where the particular combination corresponds to the established bit rate.

Further in line with the discussion above, the act of determining the extent to which the UE provides wireless backhaul connectivity between the base station and at least one device other than the UE could involve determining whether the UE provides wireless backhaul connectivity between the base station and at least one device other than the UE (e.g., whether the UE is a relay-UE or a relay-UE type device (perhaps a hotspot/D2D device)). And the act of establishing the bit rate could involve establishing as the bit rate (i) a first bit rate rather than a second bit rate if the determination is that the UE provides wireless backhaul connectivity between the base station and at least one device other than the UE and (ii) the second bit rate rather than the first bit rate if the determination is that the UE does not provide wireless backhaul connectivity between the base station and at least one device other than the UE, with the first bit rate being lower than the second bit rate. Moreover, for a UE that provides wireless backhaul connectivity between the base station and a quantity of other devices, the act of establishing the bit rate could include establishing the bit rate based on the quantity.

Figure 4:
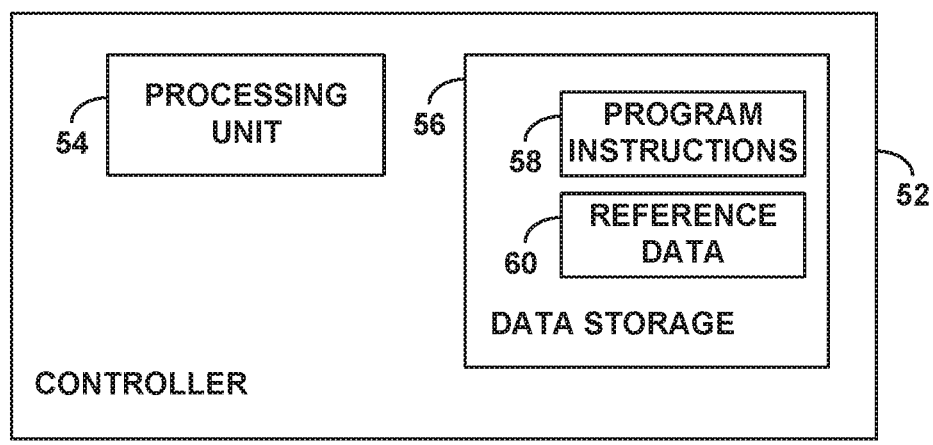
FIG. 4 is a simplified block diagram of an example controller operable in accordance with the disclosure.

FIG. 4 is next a simplified block diagram of a controller 52, showing some of the components that such a device could include in accordance with an example implementation. The controller could be a component of a UE, a base station, or a media server. As such, the controller could be configured to control operation of a UE, base station, or media server including implementing various UE, base station, or media server operations described herein, such as (i) determining an extent to which the UE provides wireless backhaul connectivity between its serving base station and at least one device other than the UE and (ii) based on the determined extent, establishing the bit rate and causing the media server to stream a portion of media content to the UE at the established bit rate.

In line with the discussion above, if the controller is a component of the UE or the UE's serving base station, causing the media server to stream the portion of media content to the UE at the established bit rate could involve the UE or the UE's serving base station sending a message to the media server requesting the media server to stream the portion of media content to the UE at the established bit rate. Alternatively, the UE could select, using an index file, a particular version of media content based on the particular version being encoded at the established bit rate, and then request from the media server the particular version of media content.

On other hand, if the controller is a component of the media server, determining the extent to which the UE provides wireless backhaul connectivity between the base station and at least one device other than the UE could involve receiving a report or message indicating the extent to which the UE provides wireless backhaul connectivity between the base station and at least one device other than the UE, and determining the extent based on data indicated in the report or message. The report or message could be received from the UE or the UE's serving base station, for instance.

As shown by way of example, the controller could include a processing unit 54 and non-transitory data storage 56. Processing unit 54 could comprise one or more general purpose processors (e.g., microprocessors) and/or one or more special-purpose processors (e.g., application specific integrated circuits or digital signal processors). And data storage 56 could comprise one or more volatile and/or non-volatile storage components, such as magnetic, optical, or flash memory, and could hold or be encoded with program instructions 58 and reference data 60. Program instructions 58 could be executable by processing unit 54 to carry out various UE, base station, or media server operations described herein, and reference data could include various data to facilitate carrying out the operations. For instance, reference data 60 could include data indicating the respective extents to which a UE provides wireless backhaul connectivity between its serving base station and one or more other devices, and mapping data the correlates various bit rates with particular extents to which a UE provides wireless backhaul connectivity between its serving base station and one or more other devices.

Exemplary embodiments have been described above. Those skilled in the art will understand, however, that changes and modifications may be made to these embodiments without departing from the true scope and spirit of the invention.

We claim:

1. In a communication system in which a base station serves a user equipment device (UE) over an air interface, a method for controlling a bit rate at which a media server streams media content to the UE, the method comprising:
    making a determination of whether the UE provides wireless backhaul connectivity between the base station and at least one device other than the UE, wherein making the determination comprises determining whether the UE is a type of device configured to provide wireless backhaul connectivity between the base station and at least one device other than the UE; and
    based on the determination, (i) establishing the bit rate and (ii) causing the media server to stream a portion of media content to the UE at the established bit rate.

2. The method of claim 1, wherein the portion of media content comprises a portion of a particular one of multiple versions of a media file, wherein each of the multiple versions is encoded at a different bit rate, and wherein causing the media server to stream the portion of media content to the UE at the established bit rate comprises causing the media server to stream to the UE the portion of the particular version of the media file based on the particular version being encoded at the established bit rate.

3. The method of claim 1, wherein the portion of media content comprises a portion of a particular one of multiple versions of a video, wherein each of the multiple versions is encoded at a different combination of resolution and frame rate, and wherein causing the media server to stream the portion of media content to the UE at the established bit rate comprises causing the media server to stream to the UE the portion of the particular version of the video based on the particular version being encoded with a particular combination of resolution and frame rate corresponding to the established bit rate.

4. The method of claim 1, wherein establishing the bit rate comprises establishing as the bit rate (i) a first bit rate responsive to the determination being that the UE provides wireless backhaul connectivity between the base station and at least one device other than the UE and (ii) a second bit rate responsive to the determination being that the UE does not provide wireless backhaul connectivity between the base station and at least one device other than the UE, wherein the first bit rate is lower than the second bit rate.

5. The method of claim 1, wherein determining whether the UE provides wireless backhaul connectivity between the base station and at least one device other than the UE comprises determining whether the UE is a relay-UE that provides wireless backhaul connectivity for a relay base station, wherein the relay base station serves one or more UEs.

6. The method of claim 1, wherein making the determination comprises determining that the UE provides wireless backhaul connectivity between the base station and a quantity of devices other than the UE, and wherein establishing the bit rate comprises establishing the bit rate based on the quantity.

7. The method of claim 6, wherein establishing the bit rate comprises:
  establishing as the bit rate (i) a first bit rate based on the quantity being more than a predetermined number and (ii) a second bit rate based on the quantity being less than or equal to the predetermined number, wherein the first bit rate is lower than the second bit rate.

8. The method of claim 6, wherein making the determination comprises determining that the UE provides wireless backhaul connectivity for a first quantity of devices other than the UE at a first time period, wherein causing the media server to stream the portion of media content to the UE at the established bit rate comprises causing the media server to serve a first portion of media content to the UE at the established bit rate, and wherein the method further comprises:
  subsequently determining that, at a second time period, the UE is providing wireless backhaul connectivity for a second quantity of devices other than the UE;
  determining that a difference between the first quantity and the second quantity exceeds a threshold amount; and
  responsive to determining that the difference exceeds the threshold amount: (i) establishing, based on the second quantity, another bit rate other than the established bit rate and (ii) causing the media server to stream a second portion of media content to the UE at the other established bit rate.

9. The method of claim 1, wherein causing the media server to stream the portion of media content to the UE at the established bit rate comprises causing the media server to switch from streaming a first portion of media content to the UE at a current bit rate to streaming a second portion of media content to the UE at the established bit rate, wherein the established bit rate is different from the current bit rate.

10. A controller configured to control a bit rate at which a media server streams media content to a user equipment device (UE), wherein the UE is served by a base station, the controller comprising:
  at least one processing unit; and
  data storage comprising instructions executable by the processing unit to carry out operations comprising:
    making a determination of whether the UE provides wireless backhaul connectivity between the base station and at least one device other than the UE, wherein making the determination comprises determining whether the UE is a type of device configured to provide wireless backhaul connectivity between the base station and at least one device other than the UE,
    based on the determination, (i) establishing the bit rate and (ii) causing the media server to stream a portion of media content to the UE at the established bit rate.

11. The controller of claim 10, wherein making the determination comprises receiving a report indicating the extent to which the UE provides wireless backhaul connectivity between the base station and at least one device other than the UE.

12. The controller of claim 10, wherein the controller is a component of the UE.

13. The controller of claim 12, wherein causing the media server to stream the portion of media content to the UE at the established bit rate comprises sending a message to the media server requesting the media server to stream the portion of media content to the UE at the established bit rate.

14. The controller of claim 12, wherein the operations further comprise receiving an index file identifying: (i) multiple versions of the portion of media content that are each encoded at different bit rates and (ii) for each of the multiple versions, a respective bit rate at which the version is encoded, and wherein causing the UE to receive the portion of media content at the established bit rate comprises causing the UE to: (i) select, using the index file, a particular version of the portion of media content based on the particular version being encoded at the established bit rate and (ii) request from the media server the particular version of the portion of media content.

15. The controller of claim 10, wherein the portion of media content comprises a portion of a particular one of multiple versions of a media file, wherein each of the multiple versions is encoded at a different bit rate, and wherein causing the media server to stream the portion of media content to the UE at the established bit rate comprises causing the media server to stream the portion of the particular version of the media file to the UE based on the particular version being encoded at the established bit rate.

16. The controller of claim 10, wherein establishing the bit rate comprises:
  establishing as the bit rate (i) a first bit rate responsive to the determination being that the UE provides wireless backhaul connectivity between the base station and at least one device other than the UE and (ii) a second bit rate responsive to the determination being that the UE does not provide wireless backhaul connectivity between the base station and at least one device other than the UE, wherein the first bit rate is lower than the second bit rate.

17. The controller of claim 10, wherein making the determination comprises determining that the UE provides wireless backhaul connectivity between the base station and a quantity of devices other than the UE, and wherein establishing the bit rate comprises establishing the bit rate based on the quantity.

18. In a communication system in which a base station serves a user equipment device (UE) over an air interface, a method for controlling a bit rate at which a media server streams media content to the UE, wherein the UE is a type of device capable of providing wireless backhaul connectivity between the base station and at least one device other than the UE, the method comprising:
  receiving, by the UE, an index file identifying: (i) multiple versions of a media file that are each encoded at different bit rates and (ii) for each of the multiple versions, a respective bit rate at which the version is encoded;

determining how many other devices the UE is providing with wireless backhaul connectivity; and based on how many other devices the UE is providing with wireless backhaul connectivity:
  (i) establishing, by the UE, the bit rate,
  (ii) selecting, by the UE using the index file, a particular version of the media file based on the particular version being encoded at the established bit rate, and
  (iii) requesting, by the UE, the particular version of the media file from a media server; and responsive to the requesting, receiving, from the media server, a portion of the particular version of the media file.

19. The method of claim 18, wherein establishing the bit rate comprises establishing the bit rate based on how many other devices the UE is providing with wireless backhaul connectivity.

* * * * *